(12) United States Patent
Worsley

(10) Patent No.: US 9,191,275 B1
(45) Date of Patent: *Nov. 17, 2015

(54) GLOBAL COMPUTER PROVISIONING

(75) Inventor: Timothy C. Worsley, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/166,610

(22) Filed: Jun. 22, 2011

(51) Int. Cl.
*H04L 12/24* (2006.01)
*G06F 11/30* (2006.01)

(52) U.S. Cl.
CPC ........ *H04L 41/0803* (2013.01); *G06F 11/3051* (2013.01)

(58) Field of Classification Search
CPC .............. G06F 11/3051; G06F 9/5011; H04L 41/0803
USPC .................................................. 709/220, 222
See application file for complete search history.

(56) References Cited

U.S. PATENT DOCUMENTS

| 5,680,547 | A | 10/1997 | Chang |
| 5,826,015 | A | 10/1998 | Schmidt |
| 5,892,906 | A | 4/1999 | Chou et al. |
| 6,484,262 | B1 | 11/2002 | Herzi |
| 7,194,619 | B2 * | 3/2007 | Abbondanzio et al. ....... 713/155 |
| 7,313,690 | B2 * | 12/2007 | Miller ........................... 713/155 |
| 7,664,834 | B2 | 2/2010 | Keith, Jr. |
| 7,822,863 | B2 | 10/2010 | Balfanz et al. |
| 7,958,506 | B2 * | 6/2011 | Mann ................................. 718/1 |
| 8,102,881 | B1 * | 1/2012 | Vincent ......................... 370/474 |
| 8,332,490 | B2 * | 12/2012 | Bozek et al. .................. 709/220 |
| 8,381,264 | B1 | 2/2013 | Corddry et al. |
| 8,386,589 | B2 | 2/2013 | Keefe et al. |
| 2004/0199758 | A1 * | 10/2004 | Meaney et al. .................... 713/2 |
| 2005/0075115 | A1 | 4/2005 | Corneille et al. |
| 2006/0200539 | A1 * | 9/2006 | Kappler et al. ............... 709/220 |
| 2009/0031026 | A1 | 1/2009 | Tanner et al. |
| 2009/0150525 | A1 | 6/2009 | Edgett et al. |
| 2009/0201830 | A1 * | 8/2009 | Angelot et al. ............... 370/254 |
| 2009/0276618 | A1 | 11/2009 | Madjlessi |
| 2010/0017597 | A1 | 1/2010 | Chandwani |
| 2010/0057890 | A1 * | 3/2010 | DeHaan ........................ 709/220 |

(Continued)

OTHER PUBLICATIONS

Office action for U.S. Appl. No. 13/231,523, mailed on Jan. 16, 2013, Worsley, "Secure Computer Provisioning and Operation", 10 pages.

(Continued)

*Primary Examiner* — Joe Chacko
(74) *Attorney, Agent, or Firm* — Lee & Hayes, PLLC

(57) ABSTRACT

A networked computer device can be provisioned by customizing the computer device to contain a specification of a particular provisioning server. For example, a network interface device can be pre-configured and installed in the computer device. The pre-configuration of the network interface device may include embedding a provisioning service identification in the network interface device. The network interface device may be further configured to perform provisioning from a provisioning service indicated by the embedded provisioning service identification. In addition, or alternatively, the network interface device, or the computer within which it is installed, may be configured to authenticate with a provisioning server based on authentication information that has been embedded within firmware of the computer or network interface device.

31 Claims, 6 Drawing Sheets

(56) References Cited

U.S. PATENT DOCUMENTS

| | | |
|---|---|---|
| 2010/0191852 A1 | 7/2010 | Black et al. |
| 2010/0325736 A1 | 12/2010 | Sadovsky et al. |
| 2011/0125990 A1* | 5/2011 | Khosravi et al. ............ 713/2 |
| 2011/0320799 A1 | 12/2011 | Lam |
| 2012/0011354 A1 | 1/2012 | Owen |
| 2012/0066750 A1 | 3/2012 | McDorman et al. |
| 2012/0179900 A1* | 7/2012 | Temporelli ............ 713/2 |
| 2012/0214441 A1 | 8/2012 | Raleigh |
| 2012/0265984 A1 | 10/2012 | Ramanujan |
| 2012/0272090 A1 | 10/2012 | Poisner |
| 2012/0322422 A1 | 12/2012 | Frecks, Jr. et al. |
| 2013/0013910 A1* | 1/2013 | Temporelli et al. ............ 713/2 |

OTHER PUBLICATIONS

Office action for U.S. Appl. No. 13/166,641, mailed on Dec. 13, 2012, Worsley, "Secure Computer Provisioning", 11 pages.

Office action for U.S. Appl. No. 13/166,641, mailed on Jul. 2, 2013, Worsley, "Secure Computer Provisioning", 14 pages.

Office action for U.S. Appl. No. 13/231,523, mailed on Aug. 21, 2013, Worsley, "Secure Computer Provisioning and Operation", 9 pages.

Office Action for U.S. Appl. No. 13/237,644, mailed on Mar. 27, 2014, Timothy C. Worsley, "Mobile Provisioning Device", 7 pages.

Office Action for U.S. Appl. No. 13/237,693, mailed on Jan. 30, 2014, Timothy C. Worsley, "Secure Dynamic Network Configuration", 9 pages.

* cited by examiner

GLOBAL COMPUTER PROVISIONING

BACKGROUND

Online services are designed so that their capacities can be expanded by adding additional computer servers. A large online service may be supported by thousands of servers or server instances, which are largely indistinguishable from each other.

Before it becomes operational, each server is provisioned with the software that is responsible for the specialized functions of the server. Provisioned software may include operating systems, utilities, drivers, applications, and so forth.

Computer servers can be provisioned manually, by technicians who supply physical media from which the servers may install selected software. Automated provisioning processes are also used, in which servers automatically utilize a local network connection to download their operating software. There are standard protocols for implementing such automated provisioning.

The Preboot eXecution Environment (PXE) is an example of an existing protocol that can be used to automatically provision computers in a networked environment. In this environment, a computer has embedded pre-boot software that communicates over an available network connection to locate a configuration server such as a Dynamic Host Configuration Protocol (DHCP) server. If such a DHCP server is located, the computer communicates with the DHCP server to obtain an initial network configuration. The initial network configuration allows the computer to communicate using higher-level communication protocols such as the Internet Protocol (IP) and other related networking protocols.

The computer and DHCP server can also be configured to utilize PXE to specify operating software to be obtained and executed by the computer. Under PXE, the DHCP server indicates to the computer the identity or network address of a PXE server from which the computer is to obtain its operating software. In response to receiving this information, the computer establishes communications with the identified PXE server, downloads the proffered software, and executes it. This process allows large numbers of computer servers to be provisioned automatically, without significant human attention.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
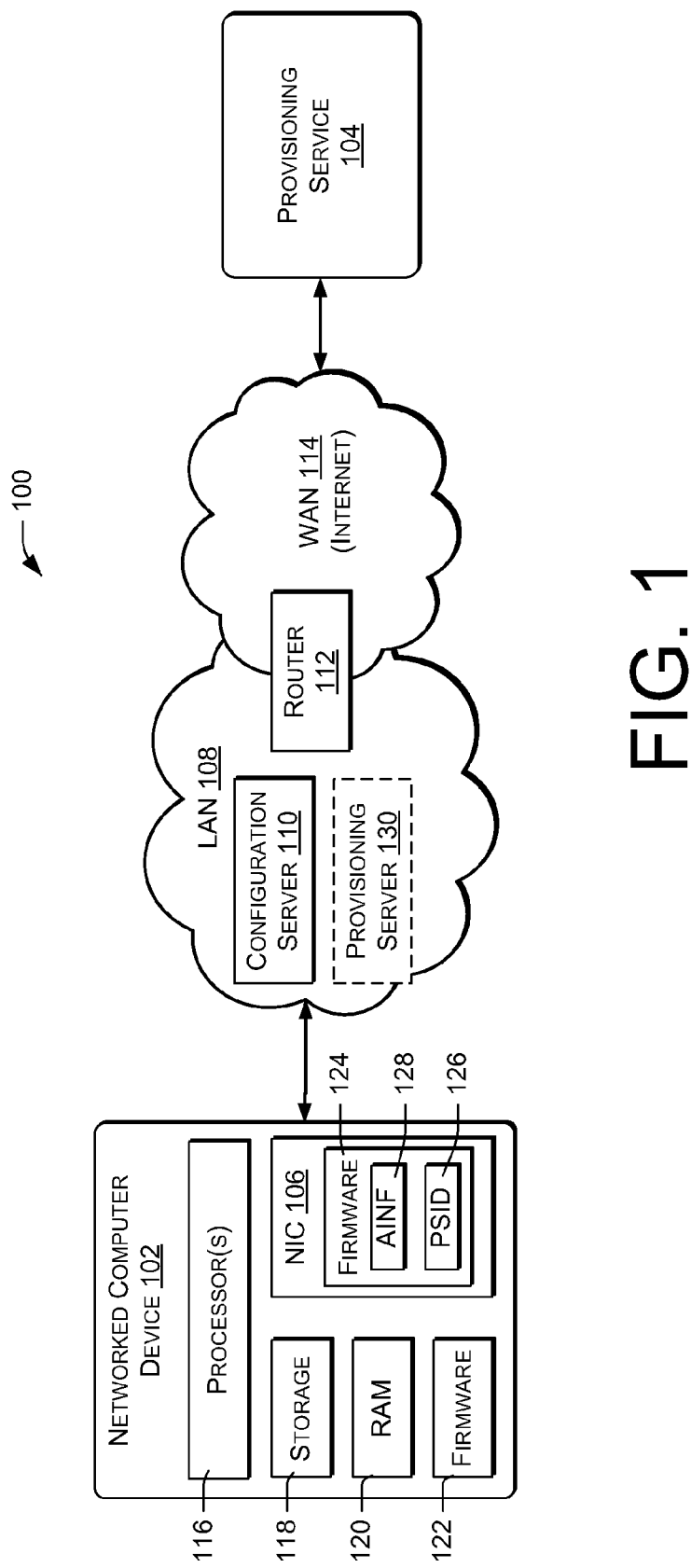
FIG. 1 is a block diagram illustrating a system for securely provisioning networked computers from remotely located provisioning services.

This disclosure describes systems, devices, and techniques that can be used to automatically provision computers, servers, and other networked devices in network environments that may not be controlled or secure.

A computer device typically has a BIOS (Basic Input/Output System), which is the first software executed by the device when powered on. The BIOS may also be referred to as firmware or boot firmware, and different sub-components of a computer device may each have their own BIOS or firmware.

In certain embodiments described herein, the firmware of a computer device is customized to use automated network-based provisioning procedures in situations where local configuration servers are not trusted or are not subject to customized configuration or control. In these embodiments, the pre-boot firmware of the computer device is customized so that it contains a global identification of a specific provisioning server or service from which the computer device is to be provisioned. After obtaining a local network configuration from a local, possibly untrusted or insecure configuration server, the computer device establishes communications with the provisioning server or service that has been identified within the pre-boot firmware of the computer—rather than any provisioning server that might have been identified by the local configuration server. The computer then boots and/or provisions itself from this provisioning server or service.

The computer device firmware can be additionally or alternatively configured to verify or confirm the identity of the provisioning server using cryptographic authentication techniques or other means. For example, the computer firmware may request that the provisioning server authenticate itself by providing a signature that can be validated using cryptographic techniques. Similarly, the computer device may authenticate itself to the provisioning server by providing a digital signature or other credentials that can be validated by the provisioning server.

Further remote provisioning techniques may include providing a configuration identification or code to the provisioning service, indicating an intended configuration for the computer. The provisioning service may serve multiple customers and/or computer configurations, and the configuration code may allow the provisioning service to determine which of many available configurations should be used to provision a requesting computer. In some embodiments, the configuration code may be provided in conjunction with authentication procedures.

The computer firmware may comprise the computer's system BIOS or may alternatively comprise the BIOS of a sub-component such as the network interface card of the computer. Furthermore, in some embodiments the computer may be configured to utilize pre-boot firmware of a removable device such as a removable or attachable communications interface. In yet further embodiments, the computer may be connected to perform its network communications through a physical network device or adapter that performs the functions described above on behalf of the computer and on behalf of other computers that are configured to communicate through the physical network device or adapter. These embodiments will be described more fully below.

FIG. 1 shows an environment 100 in which a networked computer device 102, referred to simply as the computer 102 in the following discussion, is configured to be provisioned from a provisioning server or service 104. In this embodiment, the computer 102 has a network interface device or network interface card (NIC) 106 that is configured for communications over a local or local-area network (LAN) 108. The network interface 106 is configured as a boot peripheral. The local network 108 may have one or more configuration servers 110, which may comprise DHCP servers. The local network 108 may also have a network router 112 that enables communications to and from a wide-area network (WAN) 114, which may be a public network such as the Internet, and which may in turn provide a conduit for communications with a myriad of servers, services, components, and other private networks. Of particular interest in this context is the provisioning server or service 104, from which individual computers—including the computer 101—can be provisioned. The provisioning service 104 may be maintained by a business entity to automatically provision its own computer servers, or may be maintained by a service provider for use by multiple customers of the service provider. The term "service," as used herein, may refer to a single server or a plurality of coordinated servers.

Conventional communications protocols such as the Internet Protocol (IP) may be used for communication between the various entities shown in FIG. 1. In particular, IP version 4 (IPV4) and/or version 6 (IPV6) may be used in certain embodiments.

The illustrated network environment is inherently insecure. The wide-area network 114, for example, is considered insecure because of its public nature. In addition, the local-area network 108, while often private, may not be under the direct control of the entity desiring to partition the computer 102. Thus, the provisioning entity may not be able to configure local network, and may not be able to specify the provisioning information provided by local provisioning servers.

Furthermore, IP communication protocols such as the popular IPV4 and IPV6 protocols are insecure, being subject to eavesdropping, tampering, spoofing, and so forth.

The provisioning service 104 can be globally identified by its network address. In the Internet environment, the provisioning service 104 may be identified by a unique IP address or Universal Resource Locator (URL). Other forms of global identification may also be used to uniquely identify the provisioning service among different network entities that are accessible through the wide-area network 114.

The computer 102 may have a processor 116 that executes instructions and programs that are stored in or retrieved from various types of computer-readable memory. Examples of such memory are categorized in FIG. 1 as storage 118, random-access memory (RAM) 120, and BIOS or firmware 122. Storage 118 typically comprises a hard-disk or similar non-volatile memory, and may include external devices. RAM 120 may comprise electronic memory or other types of relatively fast, electronically-accessible memory. Firmware 122 may comprise read-only memory (ROM), flash memory, or any other type of persistent memory that can be accessed by the processor 116. Firmware 122 may include pre-boot information for the computer 102, such as instructions, modules, and/or routines for initializing itself and for obtaining its operating software. More specifically, the pre-boot information may comprise the instructions that the processor 116 will execute upon being powered on.

The network interface 106 may comprise an interface for a wired or wireless network connection, such as an Ethernet interface, a wireless 802.11x interface, a cellular data interface, or some other type of communications interface. The network interface 106 may include its own BIOS or firmware 124, which may be implemented as ROM, flash memory, etc., and which may contain initial operating instructions for the network interface 106. The network interface may be an integral part of the computer 102, or may be installable or removable. For example, the network interface may be installable by plugging it into a computer backplane, a USB port, or some other interface of the computer.

The initial operations of the computer 102 may be dictated by the computer's firmware 122, by the network interface's firmware 124, or by a combination of both. For example, the firmware 124 of the network interface 106 may be responsible for broadcasting a network configuration request to the local network 108, to which an available configuration server 110 may respond. The network interface 106 may then configure itself in response information received from the configuration server 110. This initial configuration information may include the network address of the computer 102 and other network parameters of the computer 102 and network interface 106, which when implemented allow the computer 102 to communicate over the local network 108 and the wide-area network 114.

The computer firmware 122 may be responsible for other things, such as initially communicating with the network interface 106 and other input/output (IO) components of the computer 102. In some embodiments the computer firmware 122 may be responsible for network initialization, including initial communications with the configuration server 110, and in some cases the network interface 106 may not have its own dedicated firmware 124.

The following discussion assumes that initial network configuration and provisioning is implemented by the firmware 124 of the network interface 106. It is to be understood that other embodiments may allocate this functionality, either in part or in whole, to different components of the computer 102—such as to the firmware 122 of the computer 102. Furthermore, the functions attributed to the network interface 106 may be performed by other boot devices, including memory devices such as memory cards and external storage devices.

In the illustrated embodiment, the firmware 124 is configured to receive initial network configuration information from the local configuration server 110. Note that the local network 108 may also have a local provisioning server 130, from which computers may be provisioned. The local configuration server 110 may instruct the firmware 124 to perform computer provisioning from such the local provisioning server 130.

More specifically, the configuration server 110 may be a DHCP server, and the network interface 106 may be configured through its firmware 124 to query the configuration server 110 for network configuration information using the DHCP protocol. As part of the DHCP protocol, the configuration server 110 may provide the network address of the provisioning server 130. The provisioning server 130 may be a PXE server, from which the computer 102 can obtain a bootable software image.

In the described embodiment, however, the firmware 124 is customized to contain a provisioning service identification (PSID) 126, identifying one or more provisioning services 104 from which the computer 102 is to provision itself. If the computer 102 receives a local assignment of a provisioning server 130 from the local configuration server 110, the local assignment is ignored in favor of the provisioning service identified by the provisioning service identification 126, which has been pre-configured within the firmware 124. The provisioning service identification 126 may be an IP address, a URL, or some other type of specification allowing the computer 102 to identify and access one or more provisioning services 104 via the wide-area network 114. Thus, after receiving local network configuration information, the computer 102 contacts the provisioning service 104 through the wide-area network 114 and downloads a boot image. Communications between the computer 102 and the provisioning service 104 may utilize PXE communication and file transfer protocols.

The firmware 124 may in some embodiments be further customized to contain authentication information (AINF) 128. The authentication information 128 enables the computer 102 to verify the identity of the provisioning service 104, and also may allow the computer 102 to authenticate itself with the provisioning service 104. Using the authentication information 128, the computer 102 can ensure that it is communicating with the intended provisioning service 104. Similarly, the provisioning service 104 can ensure that it provisions only authorized computers. The authentication information 128 may also allow the provisioning service 104 to reliably identify the computer 102, and to thereby provide customized provisioning information and software for different requesting devices.

Figure 2:
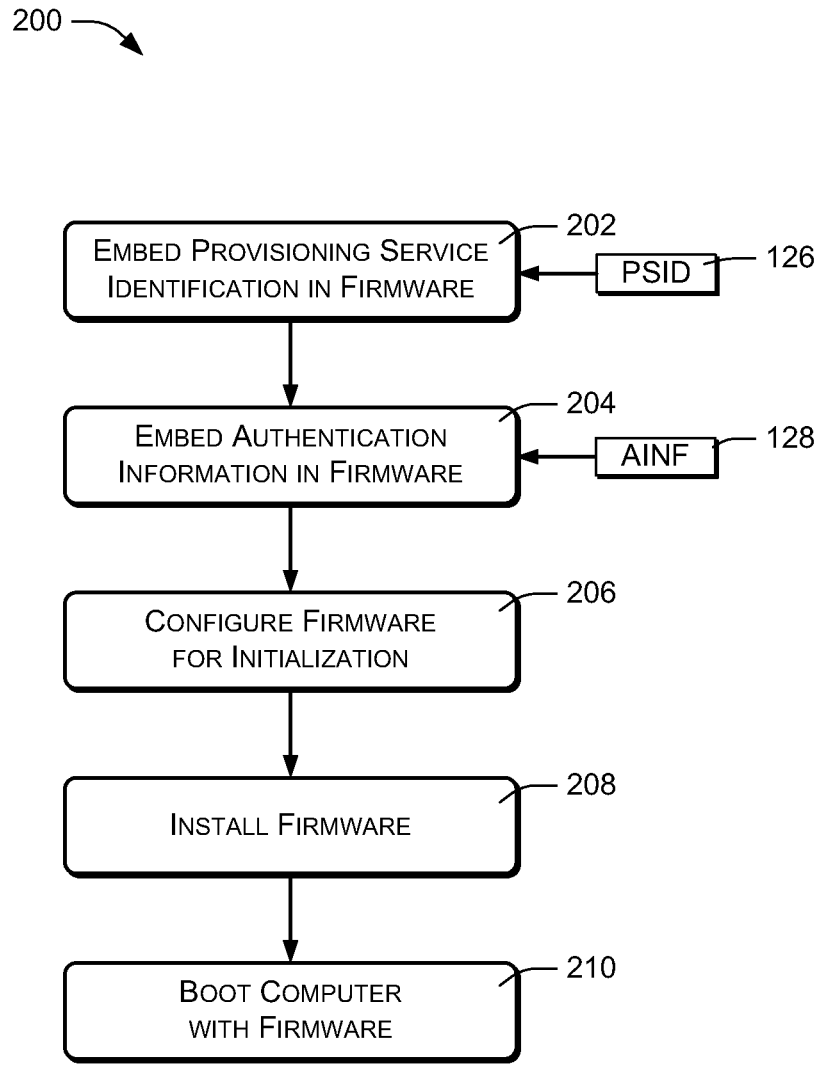
FIG. 2 is a flow diagram illustrating a method of configuring a computer for secure global provisioning.

FIG. 2 illustrates a process 200 for configuring, initializing, and/or provisioning a computer or computer-like device from a remote provisioning service. The actions of the process 200 will be described with reference to the elements of FIG. 1, although it is to be understood that the process 200 may also be implemented in other environments.

In illustrated embodiment, an action 202 comprises embedding the provisioning service identification 126 in the firmware 122 of the computer 102 or the firmware 124 of a computer sub-component such as the network interface 106. The provisioning service identification 126 may comprise a numerical network address, such as an IP address. The provisioning service identification 126 may alternatively comprise a domain name, URL, or other identifier that can be resolved to an IP address using domain name services (DNS). Other forms of direct and indirect service identifications or addresses may also be used.

An action 204 comprises embedding the authentication information 128 in the firmware of the computer 102 or computer sub-component. The authentication information 128 may comprise cryptographic keys, certificates, signatures, tokens, usernames, passwords, and so forth. The authentication information 128 can be used to authenticate the provisioning service 104 as well as to authenticate or authorize the computer 102 with respect to the provisioning service 104.

An action 206 may comprise configuring the firmware of the computer 102 or computer sub-component for initialization. Such initialization may include receiving a local network configuration from the local configuration server 110 upon startup, and subsequently initiating computer provisioning from the provisioning service 104 identified by the embedded provisioning service identification 126. The initialization behavior of the configured firmware will be described in more detail below, with reference to FIG. 3.

An action 208 comprises installing the configured firmware into the computer 102. This may comprise "burning" the firmware to a hardware component of the computer or computer sub-component. The action 208 may also, or alternatively, comprise physically installing a pre-configured sub-component or other physical element in the computer or computer sub-component. For example, the action 208 may comprise installing a specially-configured network interface 106 into a computer, wherein the network interface 106 has previously been customized in accordance with the actions 202, 204, and 206. Such a network interface card may be installed in a computer backplane, as a removable USB device, or by otherwise integrating with or attaching to the computer 102.

An action 210 may comprise booting or initializing the computer 102 using the firmware installed in the action 208. This may comprise executing the firmware upon powering on the computer 102.

Figure 3:
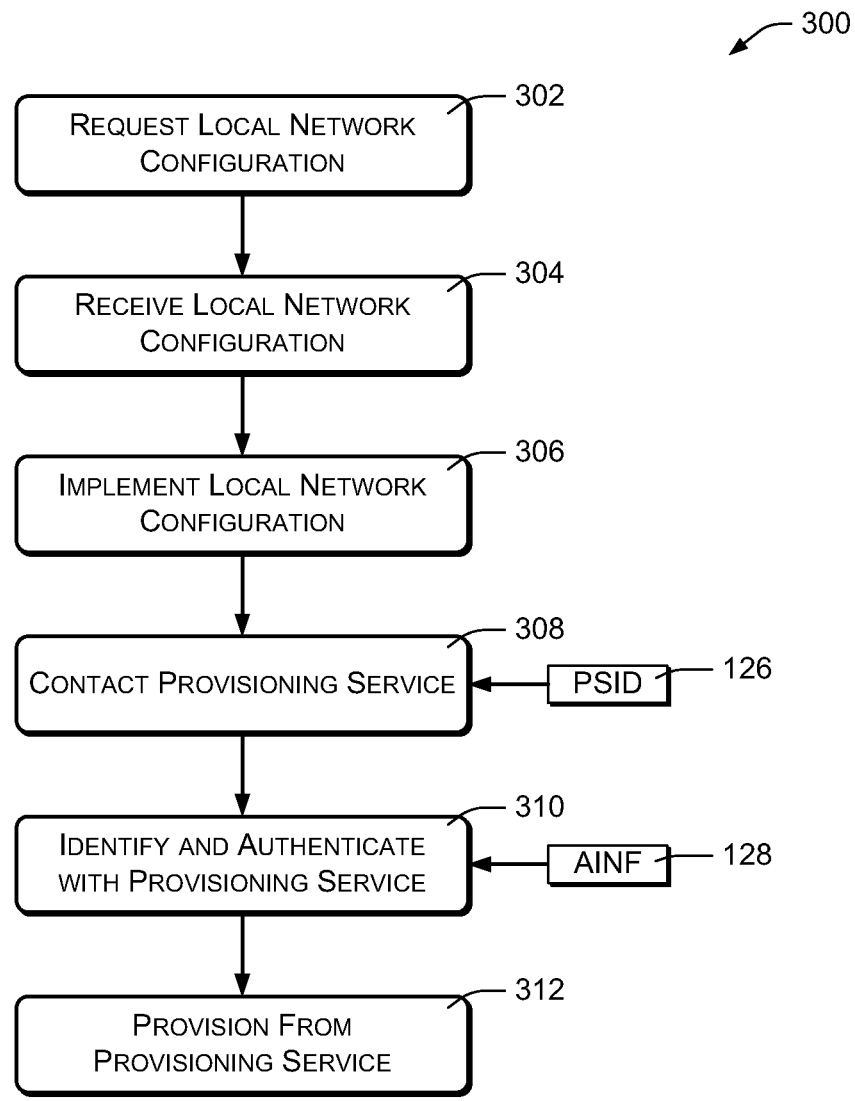
FIG. 3 is a flow diagram illustrating a method of securely provisioning a networked computer from remotely located provisioning services.

FIG. 3 illustrates a process 300 for provisioning a networked computer or other device in an environment such as that shown in FIG. 1, using pre-configured or customized firmware as described above with reference to FIG. 2. In this environment, provisioning comprises configuring or re-configuring a computer for a particular purpose. Provisioning may include providing and installing a hard disk image for the computer, and/or providing other data to be stored on the hard disk or other memory of the computer. Provisioning may further include organizing hard disk data and configuring computer hardware and software components for specialized operation. Provisioning may include installing, re-installing, configuring, and/or securing computer operating systems, applications, and other computer components, as well as defining, configuring, and initiating various tasks to be performed by the computer. Provisioning may include customizing or personalizing the computer in various ways, depending on the functions to be performed by the computer and/or the environment in which it will operate.

In some embodiments, the process 300 may represent the initialization or boot actions that are performed by the computer 102 upon being powered on or first connected to the local network 108. Thus, the actions of the process 300 may be implemented by computer-executable programs and/or processor instructions within the firmware 122 or 124 of the computer 102. The actions will be described with reference to the components illustrated by FIG. 1.

An action 302 comprises requesting a local network configuration from the local configuration server 110. An action 304 comprises receiving the requested local network configuration from the configuration server 110. In certain embodiments, the actions 302 and 304 may involve network DHCP communications, such as broadcasting a DHCP request on the local network 108 and receiving a DHCP response from a DHCP server. The received local network configuration may include an IP address for adoption by the requesting computer 102, as well as other network parameters such as gateway addresses, DNS server addresses, communication parameters, and so forth. The received local network configuration may also specify a provisioning server such as a PXE server, although the requesting computer 102 is configured to ignore any such indication of a provisioning server.

An action 306 comprises implementing the received local network configuration. This may include initializing network parameters as described above. However, provisioning information, such as PXE information provided by the local configuration server 110, is ignored in favor of the provisioning information that has previously been embedded by way of the actions 202 and 204 of FIG. 2.

An action 308 comprises contacting and establishing communications with the provisioning service 104 indicated by the embedded provisioning service identification 126. Communications between the computer 102 and the provisioning service 104 may utilize conventional communications protocols, including PXE protocols, file transfer protocol (FTP), and others. In certain embodiments, the PXE protocol may be configured or extended to use secure protocols such as hypertext transfer protocol secure (HTTPS). Other secure communications protocols may alternatively be employed, either independently or in conjunction with existing provisioning protocols.

An action 310 may comprise identifying and authenticating with the provisioning server indicated by the embedded provisioning service identification 126, based on the authentication information 128 that has been embedded in the computer firmware. Identifying may include providing a configuration identifier or code to the provisioning service 104. Such a configuration code may correspond to a computer, user, customer, or account, and may be used by the provisioning service 104 to determine how to respond to provisioning requests. For example, the provisioning service 104 may be configured to provision requesting computers differently, depending on their identification as indicated by a provided configuration code. Groups of computers using the same configuration code may be configured or provisioned in the same manner, while different computers, using different configuration codes, may be configured or provisioned differently. In some cases, a computer identification code such as the computer's media access control (MAC) address may be used to form at least part of the computer or provision identification code.

The action 310 may also include authentication between the requesting computer 102 and the provisioning service 104. Authentication between these two entities may be unilateral, involving only the authentication of the provisioning service 104 or of the provisioned computer 102. Alternatively, the authentication may be bilateral, in which both the computer 102 and the provisioning service 104 authenticate themselves to each other.

The authentication action 310 may include the exchange and/or validation of one or more certificates, signatures, credentials, keys, key pairs, and so forth, and may utilize cryptographic elements and techniques. For example, the authentication information 128 may include a public cryptographic key corresponding to a private cryptographic key belonging to the provisioning service 104. In order to authenticate the provisioning service 104, the provisioning service 104 may provide a signature that has been created with the private key, which the computer 102 may validate using the corresponding public key. Similarly, the authentication information 128 may include account credentials that may be submitted to the provisioning service 104 to authorize and/or authenticate the computer 102, and which grant the computer 102 privileges with respect to the provisioning service 104.

An action 312 comprises provisioning the computer 102 from the provisioning service 104. This may involve receiving software, which may include boot routines, drivers, programs, applications, operating systems, scripts, and so forth. Furthermore, the provisioning may be customized based in the identity of the requesting computer 102. In other words, the provisioning service 104 may be configured to provide different provisioning information to different computers or groups of computers. As mentioned above, the communications between the computer 102 and the provisioning service 104 may specify an account and/or group to which the requesting computer 102 belongs. The provisioning service 104 may be configured to provision requesting computers in accordance with the accounts or groups to which they belong. This may be useful in situations where the provisioning service 104 provides provisioning services to multiple different customers, accounts, and so forth; and/or where different provisioning may be needed for different groups of requesting computers.

Although the descriptions above assume that the provisioning server identification 126 and authentication information 128 are embedded within firmware associated with the computer 102, the same information may in some embodiments be accessible to the computer 102 or its associated firmware in other ways. For example, the provisioning server identification 126 and authentication information 128 may be retrieved by the computer firmware from a removable component or token such as a memory card or smartcard. Authentication procedures may be implemented so that communications with such a memory card or smartcard are secure and authenticated.

Furthermore, although the descriptions above assume that the described functionality is embedded and/or implemented by the requesting computer 102 or a sub-component of the requesting computer 102, the same or similar functionality may be provided by components external to the requesting computer 102, such as by network components or devices through which the computer 102 communicates.

Figure 4:
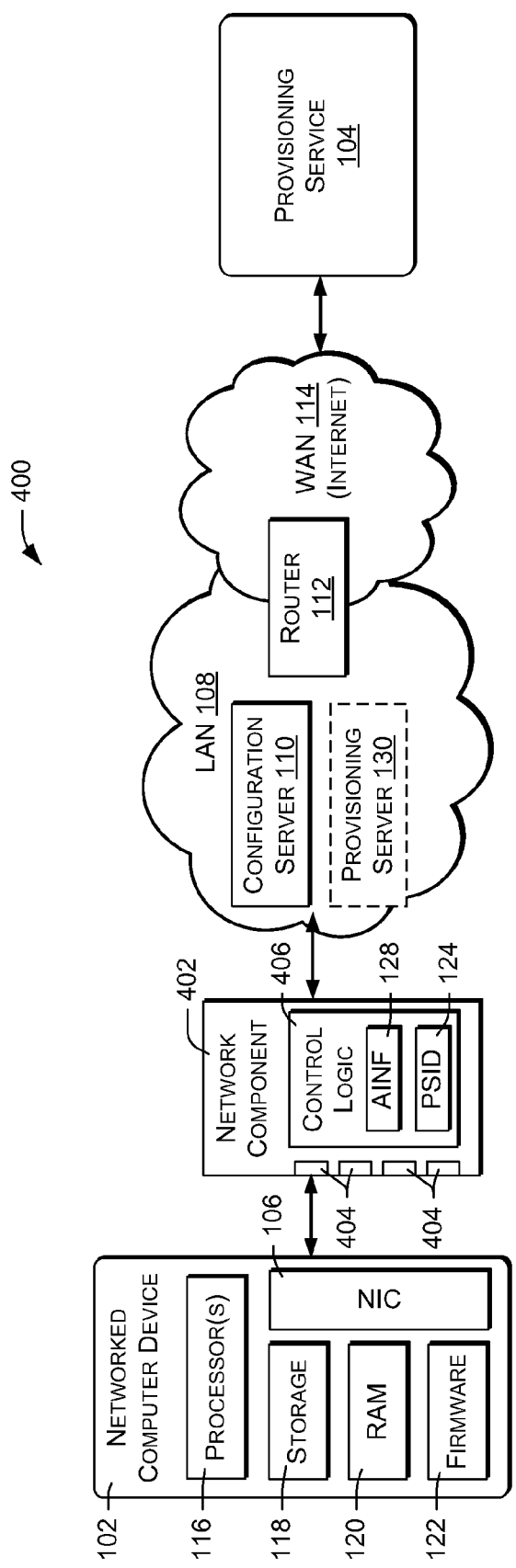
FIG. 4 is a block diagram illustrating an alternative embodiment for securely provisioning networked computers from remotely located provisioning services.

FIG. 4 shows an embodiment 400 in which the described provisioning functionality may be provided by way of such an external network peripheral or component 402. This embodiment is similar to that of FIG. 1, and similar components have been labeled with the same reference numerals as those of FIG. 1. In this embodiment, however, the computer 102 may be configured conventionally, with conventional firmware 122 and a non-customized network interface 106. In other words, the customizations of FIGS. 2 and 3 need not be performed with respect to the computer 102 or its sub-components. Instead, the computer 102 may be located behind a customized network component 402, so that communications between the computer 102 and the local network 108 take place through the customized network component 402.

The network component 402 may comprise a communications component, and may perform functions similar to those of a network router, hub, and/or switch. It may have multiple network communication ports 404, allowing connection by one or more computers 102. The network communication ports 404 may comprise wired or wireless ports.

The network component 402 may have firmware or other control logic 406, which dictates the operation and functionality of the network component 402. The control logic 406 may include or have access to a provisioning service identification 126 and authentication information 128, as described above.

In this example, the computer 102 is configured to communicate with the local network 108 through the computer's network interface 106 and through the network component 402. During initialization, the computer 102 may broadcast a configuration request using the DHCP protocol. The network component 402 may be configured to simply pass this configuration request to the local network 108, which may generate a response from the local configuration server 110. The configuration response may be received or intercepted by the network component 402, and altered prior to passing it back to the computer 102. Specifically, the network component 402 may modify any provisioning information indicated by the configuration response. Thus, whereas the configuration response from the configuration server 110 may indicate that provisioning should be performed from the local provisioning server 130, the network component 402 may modify the configuration response to indicate that such provisioning is to be performed from the provisioning server identified by the provisioning service identification 126. This may involve substituting the IP address of the provisioning service 104 in place of the IP address of the local provisioning server 130.

The network component 402 may be configured to support multiple networked computers 102 in this manner. That is, multiple computers 102 may be connected to the local network 108 through the ports 404 of a single customized network component 402, with the result that all of such computers 102 are instructed to provision themselves from the provisioning service 104. In this embodiment, it is not necessary to provide customized firmware for the individual computers 102.

The network component 402 may optionally be configured to perform authentication procedures as described above prior to returning provisioning information to the computer 102. Thus, it may include or have access to authentication information 128, which may comprise cryptographic data or other credentials allowing authentication of the network component 402 with the provisioning service 104, and allowing the network component 402 to authenticate the provisioning service 104. If authentication fails, the network component 402 may be configured to deny provisioning information to the computer 102.

Although the provisioning server identification 126 and authentication information 128 are assumed in the description above to be embedded within the network component 402, the same information may in some embodiments be accessible to the network component 402. For example, the provisioning server identification 126 and authentication information 128 may be retrieved by the network component 402 from an installable, removable or accessible component such as a memory card or smartcard. Authentication procedures may be implemented so that communications with such a memory card or smartcard are secure and authenticated. Furthermore, the provisioning server identification 126 and authentication information 128 may be stored temporarily in memory of the network component 402, or in other element of the network component such as in an application-specific integrated circuit (ASIC), field-programmable gate array (FPGA), or other logic component accessible to the network component 402.

Figure 5:
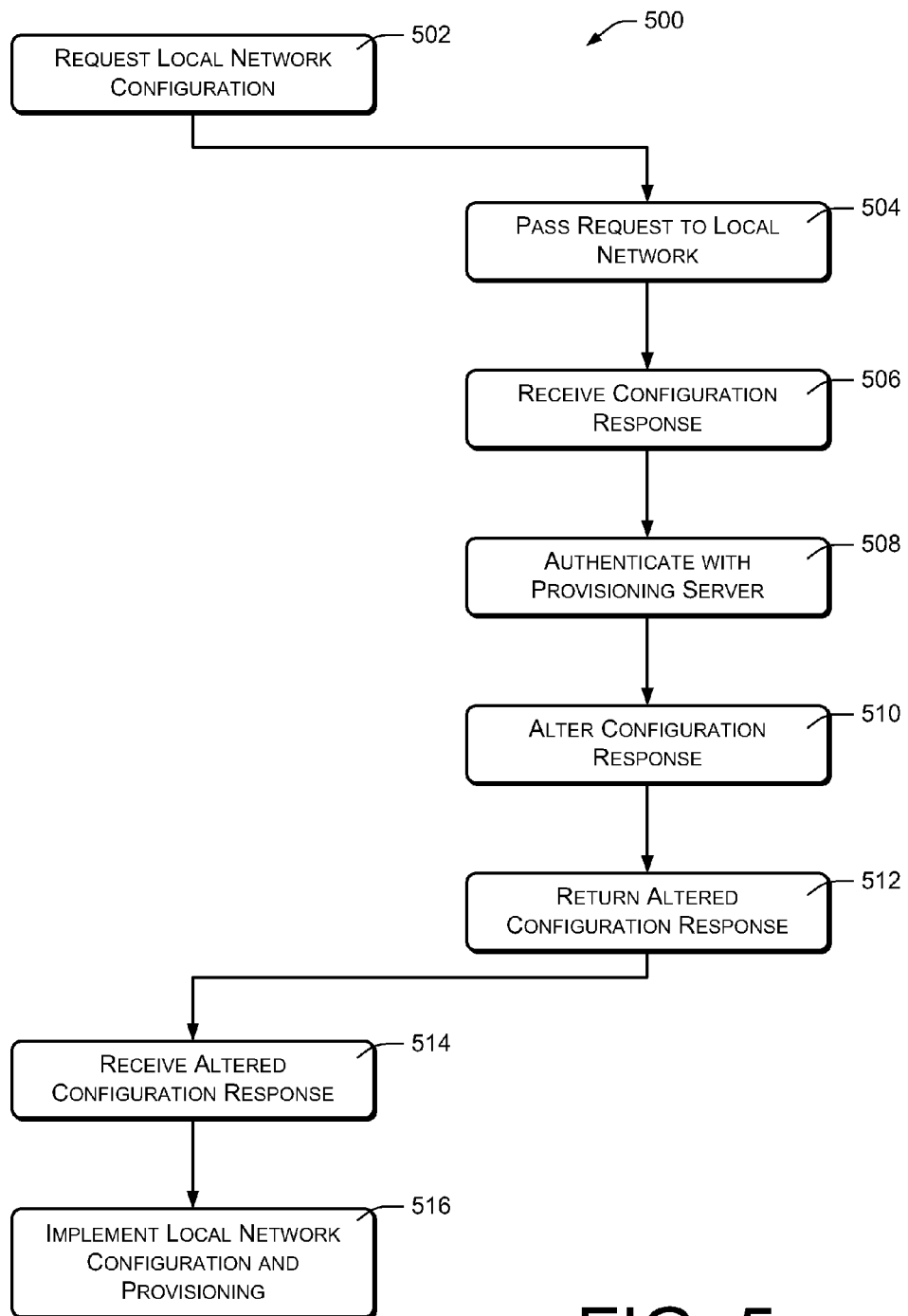
FIG. 5 is a flow diagram illustrating an alternative method of securely provisioning a networked computer from remotely located provisioning services.

FIG. 5 illustrates an example process 500, which includes the respective actions of the computer 102 and the network component 402 in the embodiment of FIG. 4. Actions performed by the computer 102 are shown on the left; actions performed by the network component 402 are shown on the right. Note that the combined operation of the computer 102 and the network component 402 may be considered equivalent to the operations illustrated by FIG. 3, with different actions being performed by the computer 102, the network component 402, or by a combination of both.

An action 502, performed by the computer 102, comprises issuing a local network configuration request, such as a DHCP broadcast. An action 504, performed by the network component 402, comprises passing the network configuration request to the local network 108, where it may be received by the local configuration server 110. An action 506, performed by the network component 402, comprises receiving a configuration response, such as a DHCP configuration response.

Rather than passing the configuration response directly to the computer 102, the network component 402 may attempt in an action 508 to authenticate with the provisioning service 104, using authentication techniques as described above. Assuming successful authentication, the network component 402 may perform an action 510 of altering the configuration response. Specifically, the network component 402 may alter any provisioning information that is present in the configuration request. In some embodiments, this may involve replacing PXE information, such as by substituting the IP address of the provisioning service 104 in place of any provisioning information that was supplied by the local configuration server 110. The network component 402 then returns the altered configuration response to the computer 102 in an action 512.

At an action 514, the computer 102 receives the altered configuration response. At an action 516, the computer 102 implements the local network configuration indicated by the configuration response and performs provisioning as indicated by the altered configuration response—from the provisioning service 104.

The network interface 106 of FIG. 1 and the network component 402 of FIG. 2 are examples of computer boot peripherals—devices to which a computer looks for boot information. Various different types of devices and peripherals may act as boot devices, including removable memory media such as USB devices and external drives, and various types of network devices. Many such devices can be customized as described above, so that requesting computers can be directed to particular provisioning services that may be accessible through the Internet or other networks. As a particular example, a removable network interface such as a USB-based network interface may be configured as described above and carried by a technician when provisioning or initializing computers or computer servers. The technician may install the removable network interface in a computer prior to starting up the computer. As the computer starts up, it may use the installed network interface as a boot device, and may as a result be instructed to boot from a particular remote provisioning server. This allow computers to be securely and reliably initialized to known states, regardless of their locations.

Figure 6:
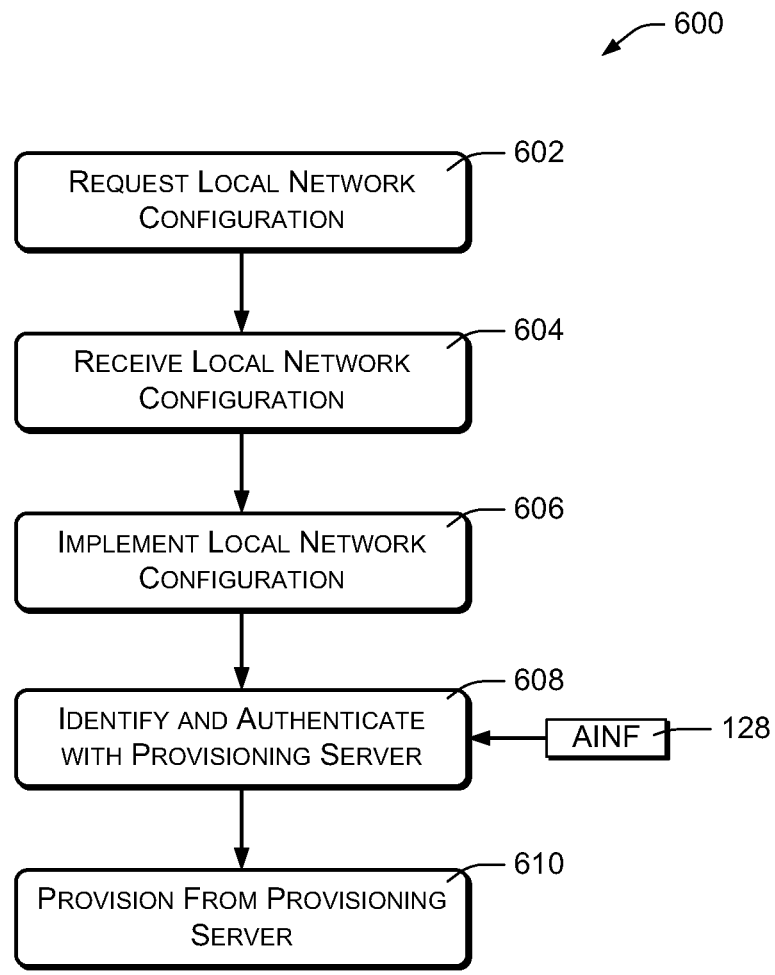
FIG. 6 is a flow diagram illustrating a method of secure provisioning.

FIG. 6 illustrates an example method 600 in which the authentication techniques described above are implemented. In this embodiment, the firmware of a computer, network interface card or other device may be customized by the inclusion of authentication information 128, without necessarily implementing the remote provisioning customizations described above. Thus, provisioning may, in this embodiment, be performed from a local provisioning server as specified by a local configuration server. The actions of FIG. 6 may represent a customized configuration of a computer component, such as customizations to a network interface 106 that is subsequently installed in the computer 102.

In the embodiment of FIG. 6, an action 602 may comprise requesting a local network configuration. Such a request may comprise a DHCP broadcast, which may be received and responded to by a DCHP configuration server such as the local configuration server 110 of FIG. 1. In an action 604, the requesting computer may receive a local network configuration from the local configuration server. The local configuration server may provide a DHCP response, which may include PXE provisioning information and/or instructions. The PXE provisioning information may specify a local provisioning server such as the provisioning server 130 of FIG. 1.

An action 606 may comprise implementing the local network configuration indicated by the received DHCP response. This may include establishing or adopting network IP addresses and other parameters as described above Implementing the local network configuration may allow the requesting computer 102 to communicate with a provisioning server such as the provisioning server 130 of FIG. 1.

An action 608 may comprise identifying and authenticating with the local provisioning server indicated by the received DHCP response, prior to provisioning the computer 102. This action may comprise supplying a configuration identification or code to the provisioning server 130, indicating a particular configuration for the requesting computer. This action may also comprise authenticating with the provisioning server 130 based on the previously discussed authentication information 128. For example, the computer 102 may provide security credentials to the provisioning server 130 prior to provisioning from the provisioning server 130. Alternatively, or in addition, the computer 102 may verify or validate security credentials provided or supplied by the provisioning server 130 prior to provisioning.

Assuming successful authentication, an action 610 may comprise provisioning the requesting computer 102 from the local provisioning server 130.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of provisioning a computer, comprising:
    embedding a provisioning service identification in a network interface device, the provisioning service identification identifying a remotely located first provisioning server maintaining software to provision the computer;
    configuring the network interface device to receive a network configuration from a configuration server upon startup, the network configuration including an identification of a second provisioning server that is different from the remotely located first provisioning server;
    further configuring the network interface device to alter the network configuration in response to receiving the network configuration from the configuration server by substituting the embedded provisioning service identification in place of the identification of the second provisioning server;
    further configuring the network interface device to initiate provisioning from the remotely located first provisioning server that is identified by the embedded provisioning service identification included in the altered network configuration; and
    installing the network interface device in the computer prior to startup of the computer.

2. The method of claim 1, wherein the embedding comprises embedding the provisioning service identification in firmware of the network interface device.

3. The method of claim 1, further comprising configuring the network interface device to provide an identification of the computer to the remotely located first provisioning server prior to initiating the provisioning.

4. The method of claim 1, further comprising configuring the network interface device to authenticate the remotely located first provisioning server prior to initiating the provisioning.

5. The method of claim 1, further comprising configuring the network interface device to provide security credentials to the remotely located first provisioning server prior to initiating the provisioning.

6. The method of claim 1, further comprising embedding provisioning security credentials in the network interface device and further configuring the network interface device to authenticate the remotely located first provisioning server based at least in part on the provisioning security credentials prior to initiating the provisioning.

7. A network device comprising:
    one or more network ports; and
    non-volatile memory storing instructions that are executable to perform actions comprising:
    accessing a service identifier stored in the non-volatile memory that specifies a first provisioning server that is remotely located from the network device and maintains provisioning software to provision networked computing devices;
    receiving a network configuration from an available configuration server, the network configuration including an identification of a second provisioning server that is different from the first provisioning server;
    at least partly in response to receiving the network configuration from the available configuration server, altering the network configuration by substituting the service identifier in place of the identification of the second provisioning server; and
    initiating provisioning from the first provisioning server that is identified by the service identifier included in the altered network configuration.

8. The network device of claim 7, wherein the non-volatile memory comprises firmware of the network device.

9. The network device of claim 7, wherein the one or more network ports comprise one or more wireless network ports.

10. The network device of claim 7, wherein the one or more network ports comprise one or more wired network ports.

11. The network device of claim 7, wherein the network device comprises a computer network interface.

12. The network device of claim 7, wherein the network device is configured for communication with a computer device over a network.

13. The network device of claim 7, wherein the available configuration server comprises a local configuration server, and wherein the network device is configured to provide network communications between a computer device and the local configuration server.

14. A method of initializing a networked device, comprising:
    embedding a provisioning service identification in firmware associated with the networked device, the provisioning service identification identifying a remotely located first provisioning server maintaining software to provision the networked device;
    configuring the networked device to receive a network configuration from an available configuration server upon startup, the network configuration including an identification of a second provisioning server that is different from the remotely located first provisioning server;

further configuring the networked device to alter the network configuration in response to receiving the network configuration from the available configuration server by substituting the embedded provisioning service identification in place of the identification of the second provisioning server; and further configuring the networked device to provision itself from the remotely located first provisioning server identified by the embedded provisioning service identification included in the altered network configuration.

15. The method of claim 14, wherein the firmware comprises a system BIOS of the networked device.

16. The method of claim 14, wherein the firmware is part of a network interface utilized by the networked device.

17. The method of claim 14, wherein the firmware is part of a networking peripheral utilized by the networked device.

18. The method of claim 14, further comprising configuring the networked device to provide an identification of the networked device to the remotely located first provisioning server prior to provisioning itself.

19. The method of claim 14, further comprising configuring the networked device to provide a configuration identification to the remotely located first provisioning server prior to provisioning itself, the configuration identification indicating a particular configuration among multiple available configurations for the networked device.

20. The method of claim 14, further comprising configuring the networked device to authenticate the remotely located first provisioning server prior to provisioning itself.

21. The method of claim 14, further comprising configuring the networked device to provide security credentials to the remotely located first provisioning server prior to provisioning itself.

22. The method of claim 14, further comprising embedding security credentials in the firmware and further configuring the networked device to authenticate with the remotely located first provisioning server based at least in part on the security credentials prior to provisioning itself.

23. A method of initializing a networked computer, comprising:

embedding a provisioning service identification in a computer boot peripheral, the provisioning service identification identifying a first provisioning server that is remotely located from the networked computer and maintains software to provision the networked computer;

configuring the computer boot peripheral to receive a network configuration from an available configuration server upon startup, the network configuration including an identification of a second provisioning server that is different from the first provisioning server;

further configuring the computer boot peripheral to alter the network configuration in response to receiving the network configuration from the available configuration server by substituting the embedded provisioning service identification in place of the identification of the second provisioning server;

further configuring the computer boot peripheral to communicate with the first provisioning server identified by the embedded provisioning service identification included in the altered network configuration to obtain a computer boot image for the networked computer; and installing the computer boot peripheral in the networked computer and instructing the networked computer to use the computer boot peripheral for startup.

24. The method of claim 23, further comprising configuring the computer boot peripheral to authenticate the first provisioning server.

25. A computer-implemented method of initializing a networked computer, comprising:

under control of one or more hardware processors configured with executable instructions, receiving a network configuration from an available configuration server upon startup, the network configuration including an identification of an available provisioning server;

obtaining a provisioning service identification from a component other than the configuration server, the provisioning service identification identifying a remotely located provisioning server that is different from the available provisioning server identified in the network configuration, the remotely located provisioning server maintaining software to provision the networked computer;

at least partly in response to receiving the network configuration from the available configuration server, altering the network configuration by substituting the provisioning service identification in place of the identification of the available provisioning server; and communicating with the remotely located provisioning server identified by the provisioning service identification included in the altered network configuration to provision the networked computer.

26. The computer-implemented method of claim 25, wherein the provisioning service identification is obtained from a removable component prior to startup of the networked computer.

27. The computer-implemented method of claim 25, wherein the provisioning service identification is obtained from a network interface associated with the networked computer during startup of the networked computer.

28. The computer-implemented method of claim 25, wherein the provisioning service identification is obtained from a peripheral of the networked computer during startup of the networked computer.

29. The network device of claim 13, the actions further comprising:

passing a configuration request received from the computer to a local network;

receiving, from the local configuration server, a configuration response including the network configuration; and sending the altered network configuration to the computer prior to the initiating the provisioning.

30. The network device of claim 7, wherein the service identifier comprises an Internet protocol (IP) address of the first provisioning server.

31. The method of claim 1, wherein the embedded provisioning service identification comprises an Internet protocol (IP) address of the remotely located first provisioning server.

* * * * *